United States Patent Office 3,356,621
Patented Dec. 5, 1967

3,356,621
RIGID POLYURETHANE FOAMS PREPARED BY USING AS THE ACTIVE HYDROGEN COMPONENT A MIXTURE OF (A) THE TRANSESTERIFICATION PRODUCT OF PENTAERYTHRITOL WITH CASTOR OIL AND (B) POLYESTER POLYOLS
Henry Sheldon Hopkins, Jr., North Billerica, and Philip L. Gordon, Lexington, Mass., assignors to General Latex and Chemical Corporation, Cambridge, Mass., a corporation of Massachusetts
No Drawing. Filed Dec. 26, 1963, Ser. No. 333,632
2 Claims. (Cl. 260—2.5)

The present invention is concerned with polyurethane foams and, more particularly, with the use of castor oil derivatives in the preparation of said foams.

Castor oils, which may be generally considered to be triglycerides of ricinoleic acid, have been employed for some time as polyols in the production of polyurethane foams. Although the foams produced have many desirable properties they are usually subject to primary and secondary shrinkage, i.e., (1) shrinkage which occurs immediately after the foam has completed its visible rise and (2) shrinkage which occurs one to several hours thereafter. For this reason it has been found desirable to use the castor oil in combination with other polyols, such as polyether polyols and polyester polyols. Even when used with other polyols shrinkage still occurs when the castor oils are used in excess of about a 1 to 9 ratio and particularly when a halohydrocarbon foaming agent is employed.

One object of the present invention is to provide derivatives of castor oil for use in said foams which can be used in substantially larger amounts than the oil itself and which substantially reduces the primary and secondary shrinkage.

Another object is to provide such derivatives which are especially useful in halohydrocarbon blown foams.

Other objects of the invention will in part be obvious and will in part appear hereinafter.

The invention accordingly comprises the process involving the several steps and the relation and order of one or more of such steps with respect to each of the others.

For a fuller understanding of the nature and objects of the invention, reference should be had to the following detailed description.

It has now been found that, by using the derivatives set forth herein, the primary and secondary shrinkage due to the use of castor oils in polyurethane foams and especially halohydrocarbon blown foams may be substantially reduced.

Generally the derivatives, which are used in the foams of the present invention, are transesterification products of castor oils with polyhydric alcohols containing at least three hydroxyl groups. In preferred embodiments the polyhydric alcohols, used in forming the transesterification products, contain about three to eight hydroxyl groups and, more particularly, about three to six hydroxyl groups. Further, they preferably have hydroxyl numbers of at least 500 and, more particularly, between about 1000 to 1875. As examples of useful polyhydric alcohols, mention may be made of glycerine, trimethylolpropane, hexanetriol, pentaerythritol, sorbitol, sucrose, arabinose and xylose. Especially useful results have been obtained using pentaerythritol.

The derivatives, used in the foams of the present invention, may be prepared by heating the castor oils with the polyhydric alcohols in the presence of a suitable transesterification catalyst, e.g., litharge, a sodium alkoxide, lithium carbonate, etc. Usually the amounts of castor oil and the polyhydric alcohol may be varied over a considerable range. Generally, the use of about 0.1 to 2.0 moles of the polyhydric alcohol to about 1 mole of the castor oil provide useful results. Particularly effective results have been obtained by using 2 moles of the polyhydric alcohol per mole of the castor oil.

The derivatives of the present invention are preferably used in combination with at least a second polyol such, for example, as linear polyols, branched polyether polyols and polyester polyols. The derivatives have been found to be particularly useful with the polyester polyols. Usually the amount of the derivative used may be varied over a considerable range. Best results have been obtained when the derivatives comprise less than 50% (on a hydroxy equivalent basis) of the total polyols present. Especially good results were obtained when the derivatives comprised about 25% of the polyols.

The derivatives of the present invention may be used in the formation of either rigid, semi-rigid or flexible foams depending upon, as is known, the amounts and nature of the other polyols and polyisocyanates with which they are polymerized. Thus, for example, large proportions of linear polyols would be employed in forming the flexible foams and large proportions of polyfunctional polyols would be used for the rigid foams. As examples of useful linear polyols which may be employed with the derivatives of this invention, mention may be made of ethylene glycol; propylene glycol; butylene glycol-2,3; butylene glycol-1,3; 2-methyl pentanediol-2,4; 2-ethylhexanediol-1,3; hexamethylene glycol; decamethylene glycol; diethylene glycol; triethylene glycol; tetraethylene glycol, polyethylene glycols having molecular weights of about 200 and 600; dipropylene glycol, tripropylene glycol and polypropylene glycols having molecular weights of about 400, 425, 750, 1200 and 2000, etc.

As pointed out above, the derivatives of the present invention were found especially effective with polyester polyols. Generally, the polyesters, for use in combination with the castor oil derivatives, may be selected from the various materials of this nature available. Usually such esters are formed by the condensation polymerization of polyols with dicarboxylic acids such, for example, as phthalic, terephthalic, isophthalic, succinic, glutaric, and adipic. The polyols, used in the condensation polymerization, generally comprise a major portion of polyols which are at least tribasic, that is, have at least 3 hydroxy groups, and lesser amounts of diols. As examples of useful diols and higher functional polyols, mention may be made of ethylene glycol; diethylene glycol; 1,2 propylene glycol; 1,4 butanediol, trimethylolethane, mannitol, hexanetriol, glycerine, trimethylolpropane and pentaerythritol.

Another example of a class of compounds which are useful in combination with the castor oil derivatives are the branched chain polyethers. Such polyethers may be formed, for example, by condensing alkylene oxides comprising 2 to 4 carbon atoms, e.g., ethylene or propylene oxide with polyhydric alcohols such, for example, as glycerine, 1,2,6 - hexanetriol, pentaerythritol, pentoses, sorbitol, glucose, sucrose, etc. The preferred polyethers for use with the derivatives of the present invention are those having hydroxyl numbers within the 250 to 700 range.

The polyisocyanates for use in the preparation of the foams of this invention may be selected from the various compounds of this nature available. As examples of such materials, mention may be made of ethylene diisocyanate; ethylidene diisocyanate; propylene-1,2-diisocyanate; butylene-1,3-diisocyanate; hexylene-1,6-diisocyanate; cyclohexylene-1,2-diisocyanate; m-phenylene diisocyanate; 2,4-tolylene diisocyanate; 2,6-tolylene diisocyanate; 3,3'-dimethyl-4,4'-diphenylene diisocyanate; 3,3'-dimethoxy-4,4'-biphenylene diisocyanate; 3,3'-diphenyl-4,4'-biphenylene diisocyanate; 4,4'-biphenylene diisocyanate; 3,3'-dichloro-4,4'-biphenylene diisocyanate; 1,5-naphthalene diisocyanate; and TDI 80/20 and TDI 65/35 (respectively, 80/20 and 65/35 mixtures of 2,4-toluene diisocyanate and 2,6-toluene diisocyanate). Particularly useful results have been obtained using PAPI (a methylene-linked polyphenylisocyanate comprising about three phenylisocyanate groups per molecule).

In preparing the foams of the present invention the ratio of the isocyanato groups to the hydroxyl groups may be varied over a considerable range. In preferred embodiments about 0.95 to 1.15 isocyanato groups are used per hydroxyl group. Particularly useful results have been obtained using about 1.05 isocyanato groups for each hydroxyl group.

As noted above, the derivatives of the present invention have been found especially effective in reducing shrinkage in halohydrocarbon blown foams. Generally such halohydrocarbons are low boiling (e.g., less than 50° C.) hydrocarbons comprising at least one halogen substituent, e.g., chlorine, fluorine, etc. The preferred blowing agents within this class are the polyhalogenated hydrocarbons comprising less than six carbon atoms and having at least one fluoro-substituent. As examples of such materials mention may be made of trichloromonofluoromethane; trichlorotrifluoroethane; dichlorohexafluoropropane; monochloroheptafluorocyclobutane; dichlorodifluoroethylene and 2,3-dichloro-1,1,3,3-tetrafluoropropane-1. The preferred polyhalogenated hydrocarbon for use in the foams of this invention is the trichloromonofluoromethane. Usually the amount of blowing agent employed may be varied depending upon the density desired. Usually about 5 to 25%, by weight, of the blowing weight per the total weight of the hydroxyl and isocyanato reactants will suffice.

Although the derivatives of the present invention are particularly useful in halohydrocarbon blown foams, it should be understood that when desired other foaming agents such as water may be used alone or in combination with the halohydrocarbons.

The foams of the present invention may be prepared by the 1-shot method wherein all the reactants are combined at once or by the well known two-step method wherein a quasi-prepolymer or semi-prepolymer is first prepared from a portion of the hydroxy reactants and an excess of the polyisocyanates.

The catalyst for use in forming the foams of this invention may be selected from the various materials which have been found useful for this purpose, e.g., amines such as dimethylethanolamine; diethylethanolamine; pyridine; N,N-diethylaniline; N-methylmorpholine; triethylamine and N,N,N',N'-tetramethylbutane-1,3-diamine. The latter material has been found particularly useful. Although the amount of catalyst employed may be varied to suit particular needs, it has been found that the use of about 0.25 to 2.0%, by weight, of the catalyst per total weight of the hydroxy and polyisocyanate reactants provides especially useful cream and cure times.

In the foams of the present invention, halogenated castor oils and especially brominated castor oils may be used in forming the derivatives. Generally the halogenation of the castor oil may be carried out by bubbling the halide of the oil while it is heated to about 50 to 150° C. and, more preferably, to about 80 to 130° C.

The following non-limiting example illustrates the preparation of derivatives within the scope of the present invention:

Example 1

About 933 gms. (approximately 1 mole) of castor oil was heated to 275° C. and to it was slowly added 272.0 gms. (about 2 moles) of pentaerythritol, which brought about a drop in temperature to about 225° C. At this stage 0.5 gm. of litharge was added and the temperature was raised to 260° C. and held there for about 4.5 hours. The product was a mixed ester of the pentaerythritol and the glyceride.

The following non-limiting example illustrates the preparation of foams within the scope of the present invention:

Example 2

Compositions comprising the following ingredients:

| Material | Equivalents | Parts (by weights) |
|---|---|---|
| Castor oil derivative of Example 1 | 0.25 | 14.8 |
| Witco R-600 (an ethylene oxide adduct of a mixture of pentaerythritol and glycerol esterified with mixture of phthalic anhydride and tall oil fatty acids having a hydroxy number of 412.5 and an equivalent weight of 136) | 0.75 | 28.87 |
| Silicone oil (cell control agent) | | 1.03 |
| Trichloromonofluoromethane | | 12.0 |
| Water | | 0.2 |
| PAPI (a methylene-linked polyphenylisocyanate comprising about 3 phenylisocyanate groups per molecule) | 1.05 | 42.79 | were mixed together and catalyzed by various amounts of N,N,N',N'-tetramethylbutane-1,3-diamine ranging between about 0.5 to 1.05 parts. The foams had cream times of 10 to 30 seconds, rise times of 30 to 45 seconds, tack-free-times of 30 to 45 seconds. The resulting cured foams were strong and free of all signs of primary and secondary shrinkage.

When the above formulation was repeated without the castor oil derivative and using 0.85 equivalent of the polyester and only 0.15 equivalent of castor oil, substantial primary and secondary shrinkage were observed.

As will be understood, the foam compositions of the present invention may contain other useful reagents such as fillers, pigments, eccelerators, surface active agents, etc.

The foams of the present invention are useful as insulators, shock-absorbers, etc.

Since certain changes may be made in the above product and composition without departing from the scope of the invention herein involved, it is intended that all matter contained in the above description shall be interpreted as illustrative and not in a limiting sense.

What is claimed is:

1. The method of making a rigid polyurethane foam, said method comprising reacting polyols with organic polyisocyanates in the presence of a halohydrocarbon blowing agent, said polyisocyanates being present in amounts so that there is about 0.95 to about 1.15 isocyanate groups per hydroxyl group, said polyols consisting essentially of a mixture of from about 25 to less than 50% on a hydroxy equivalent basis of the transesterification product of about 0.1 to 2.0 moles of pentaerythritol with one mole of castor oil, the remainder of said polyols consisting of polyester polyols formed by the condensation polymerization of polyols, at least a major portion of which have at least 3 hydroxy groups, with dicarboxylic acids.

2. A method as defined in claim 1 wherein said remainder of said polyols consists essentially of an ethylene oxide adduct of a mixture of pentaerythritol and glycerol esterified with a mixture of phthalic anhydride and tall oil fatty acids having a hydroxy number of about 412.5 and an equivalent weight of about 136.

References Cited

UNITED STATES PATENTS

| | | | |
|---|---|---|---|
| 2,833,730 | 5/1958 | Barthel | 260—2.5 |
| 2,864,780 | 12/1958 | Katz et al. | 260—18 |
| 2,995,091 | 10/1960 | Kane | 260—2.5 |
| 3,022,326 | 2/1962 | Schroeder et al. | 260—18 XR |
| 3,037,947 | 6/1962 | Elkin | 260—2.5 |
| 3,054,756 | 9/1962 | Holtschmidt et al. | 260—2.5 |
| 3,142,650 | 7/1964 | Friedman | 260—2.5 |
| 3,177,167 | 4/1965 | Skreckoski et al. | 260—18 |

(Other references on following page)

FOREIGN PATENTS 893,746  4/1962  Great Britain.

OTHER REFERENCES

Lyon et al.: "American Oil Chemists Society Journal," vol. 39, pp. 69–71 (1962).

A. Ehrlich et al.: "Castor Polyols for Urethane Foams," The Journal of the American Oil Chemists' Society, vol. 36, April 1959, pp. 149 to 154.

Toone et al.: Chemical Abstracts, vol. 54, pp. 18983b.

Brewster et al.: "Organic Chemistry" (3rd ed.), pp. 244–257.

C. K. Lyon et al.: "Solvent-Blown Reged Urethane From Castor-Based Polyols," The Journal of the American Oil Chemists' Society, vol. 38, May 1961, pp. 262 to 266.

DONALD E. CZAJA, *Primary Examiner.*

J. J. KLOCKO, Q. W. RAUCHFUSS, JR.,
*Assistant Examiners.*